Patented Aug. 3, 1954

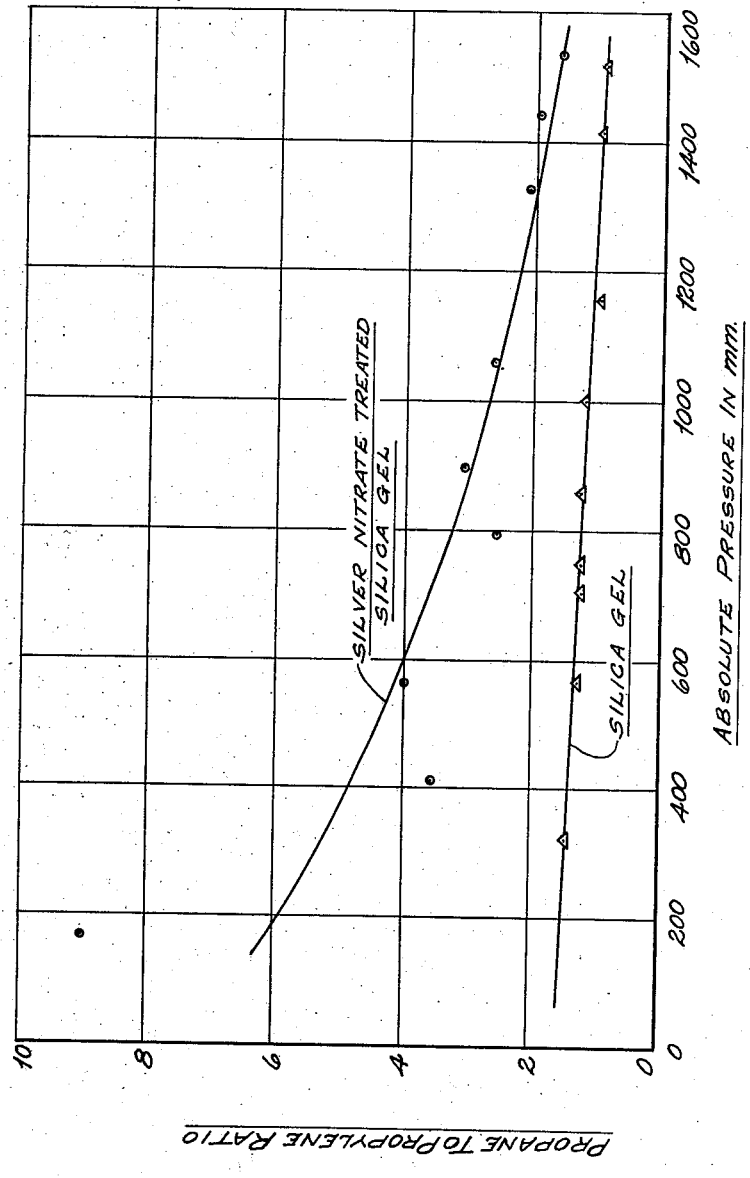

2,685,607

UNITED STATES PATENT OFFICE 2,685,607

SEPARATION OF OLEFINS FROM MIXED HYDROCARBONS

Ernest F. Pevere, Beacon, and George B. Arnold, Glenham, N. Y., assignors to The Texas Company, New York, N. Y., a corporation of Delaware Application February 21, 1952, Serial No. 272,868

2 Claims. (Cl. 260—677)

This invention relates to the treatment of mixed hydrocarbons with certain contact materials to effect the selective sorption of olefins.

In accordance with the invention the hydrocarbons are contacted with silica gel impregnated with silver nitrate which selectively adsorbs the olefins from the mixed hydrocarbons.

The invention is adapted particularly for the treatment of low boiling hydrocarbons, such as normally gaseous hydrocarbons, gasoline and naphtha, to separate olefins from the other hydrocarbons.

In order to more fully disclose the invention reference is had to the accompanying drawing which is a typical graph showing the improvement accomplished by contacting the mixed hydrocarbons with the silver nitrate coated silica gel.

In obtaining the data for the curves shown in the graph a charging stock composed of propane and propylene having a propane to propylene ratio of 0.86 was passed through a bed of silica gel under various pressures and through silica gel impregnated with silver nitrate under various pressures. The silica gel used in the test was a commercial grade and was calcined at 600° F. for three hours prior to use in the test. The silver nitrate impregnated silica gel was prepared by calcining the silica gel at 600° F. for three hours and then mixing 800 grams of the gel with a solution of 200 grams of silver nitrate in 500 cc. distilled water. The mixture was dried on a steam bath with frequent stirring and then calcined at 500° F. for six hours.

The mixed propane-propylene gas was passed through the calcined silica gel and the silver nitrate impregnated silica-gel at room temperature and the effluent gases were tested to determine the propane and propylene content. In the graph the propane to propylene mol ratio of the effluent gas is plotted against absolute pressure (mm. of mercury). It will be seen that at all pressures the selectivity of the silver nitrate impregnated silica-gel is superior to that of the silica gel without the silver nitrate and that the superior selectivity of the silver nitrate impregnated silica-gel increases markedly as the absolute pressure is reduced.

In drawing the curves through the data points the least squares method was used. A logarithmic form of equation was selected because of the curvature indicated. The least squares equation derived for the calcined silica gel is as follows:

$$\log R = 0.2101890 - 0.000153597 P$$

where $R$ is the ratio of propane to propylene and $P$ is the absolute pressure expressed in millimeters. The least squares equation derived for the silver nitrate coated silica-gel is as follows:

$$\log R = 0.8585493 - 0.000425081 P$$

where $R$ and $P$ have the same meaning. The equations appear to intersect at about 2388 mm. or 3.142 atmospheres pressure absolute. Accordingly, it would appear that the advantage of the silver nitrate impregnated silica gel should be positive only at pressures below these values. Actually it is probable that the intersection would never be realized and that the curves are actually asymptotic. In any case the comparative tests show the superiority of the silver nitrate impregnated silica gel at low pressures of about three atmospheres and below, and especially the pronounced superiority of the silver nitrate impregnated silica gel at the lower pressures. Thus, for example, in operating at atmospheric pressure with the silver nitrate impregnated silica gel the propane to propylene ratio is about 3.5 while the ratio with the calcined silica gel is only 1.3.

The process is applicable to the treatment of hydrocarbons in the liquid, vaporous or gaseous phases and is effective at low temperatures. Thus it is ordinarily not necessary to heat the charging stock since the adsorptive property of the silver nitrate impregnated silica gel is highly selective for olefins at temperatures below 100° F. In the recovery of the contact material the adsorbed olefins are readily released by heating, or by release of pressure when the adsorption of low boiling olefins has been conducted at superatmospheric pressure.

Although a preferred embodiment of the invention has been described herein, it will be understood that various changes and modifications may be made therein, while securing to a greater or less extent some or all of the benefits of the invention, without departing from the spirit and scope thereof.

We claim:

1. The method of separating olefins from paraffins contained in low boiling hydrocarbon mixtures of paraffins and olefins that comprises contacting such hydrocarbon mixture with silica gel, which has been impregnated with an aqeous silver nitrate solution and dried and calcined, under a low pressure not exceeding about 3 atmospheres pressure absolute to effect selective sorption olefins.

2. The method of separating olefins from paraffins contained in low boiling hydrocarbon mixtures of paraffins and olefins that comprises contacting such hydrocarbon mixture with silica gel, which has been impregnated with an aqueous silver nitrate solution and dried and calcined, under a low pressure within a range consisting of atmospheric and subatmospheric pressures.

References Cited in the file of this patent

UNITED STATES PATENTS

| Number | Name | Date |
|---|---|---|
| 2,471,550 | Shaw | May 31, 1949 |
| 2,498,204 | Francis | Feb. 21, 1950 |
| 2,509,486 | Danforth | May 30, 1950 |